United States Patent [19]

Lee et al.

[11] Patent Number: 4,522,742
[45] Date of Patent: Jun. 11, 1985

[54] WATER SOLUBLE FLUOR COMPOSITIONS

[75] Inventors: Duk H. Lee, Wellesley; Susan Feierberg, Watertown; Robert E. O'Brien, Belmont, all of Mass.

[73] Assignee: E. I. Du Pont de Nemours and Company Inc., Wilmington, Del.

[21] Appl. No.: 352,209

[22] Filed: Feb. 25, 1982

[51] Int. Cl.$^3$ .................. B01D 13/02; B01J 31/02; C09K 11/06; G21H 5/02
[52] U.S. Cl. .................. 252/301.16; 204/182.8; 250/303; 252/645; 430/139; 430/495; 548/235
[58] Field of Search ............ 252/301.16, 301.17, 252/301.21, 301.28, 301.34, 301.35

[56] References Cited

U.S. PATENT DOCUMENTS

| | | | |
|---|---|---|---|
| 2,765,239 | 10/1956 | Siegrist | 252/301.28 |
| 3,068,178 | 12/1962 | Kallman et al. | 252/301.17 |
| 3,193,536 | 7/1965 | Wagner et al. | 252/301.35 |
| 3,235,547 | 2/1966 | Pollack et al. | 252/301.16 |
| 3,928,227 | 12/1975 | Sena et al. | 252/301.17 |
| 3,999,070 | 12/1975 | Tarkkanen | 252/301.17 X |
| 4,146,604 | 3/1979 | Kleinerman | 424/3 |
| 4,271,035 | 6/1981 | Saito et al. | 252/301.17 |
| 4,293,436 | 10/1981 | Fost | 252/301.17 X |

FOREIGN PATENT DOCUMENTS

| | | |
|---|---|---|
| 2107818 | 8/1972 | Fed. Rep. of Germany . |
| 2222417 | 10/1974 | France . |
| 539396 | 9/1941 | United Kingdom . |
| 594741 | 11/1947 | United Kingdom . |
| 609197 | 9/1948 | United Kingdom . |
| 770889 | 3/1957 | United Kingdom . |
| 819925 | 9/1959 | United Kingdom . |
| 1105171 | 3/1968 | United Kingdom . |
| 1173170 | 12/1969 | United Kingdom . |
| 274475 | 9/1970 | U.S.S.R. . |

OTHER PUBLICATIONS

Bonner, et al., Eur. J. Biochem., 46:83 (1974).
Lasky et al., Eur. J. Biochemistry, 56:335–341 (1975).
Bonner et al., Analytical Biochem., 89:247–256 (1978).
Chamberlain, Analytical Biochemistry, 98:132–135 (1979).
Ott et al., J. American Chemistry Society, 78:1941–1944 (1956).
Bodendorf et al., Archiv der Pharm., 298:293–297 (1965).
Berlman, Handbook of Fluorescenic Spectra of Aromatic Molecules, (1971), 461–466.
McCutcheon's Publications (1980) Book I, 9, 12–15.
Ross, "Performance Parameters . . . Counting", Organic Scintillators and Liquid Scintillation Counting, 757–769, (Academic N.Y. 1971).
Kodak, Co., "Detection of Labeled Compounds on Chromatograms by Auto Radiographic Procedures", (1977), 6 pages.
Durie et al., Science, 190:1093–1095, (1975).
Panayi et al., J. Immunological Methods, 2:115–117, (1972).
Randerath, Analytical Biochem., 34:188–205, (1970).
Randerath, Analytical Biochem., 41:991 and 992, (1969).
Meeks et al, Int'l. J. of App. Red & Is., 26:87 and 88, (1975).
Gruenstein et al., Analytical Biochem, 61:429–433, (1974).
Pyrdz, et al., Anal. Chem., 42:156–161, (1970).
Pyrdz, et al., Anal. Chem., 45:2106–2111, (1973).
Schulman et al., Chem Abs., 90:86573g, (1973).
Lee et al, "Water Soluble Blue–Green Lasing Dyes for Flashlamp-Pumped Dye Lasers", *IEEE Journal of Quantum Electronics*, vol. QE-16, No. 7, Jul. 1980.

Primary Examiner—Howard S. Williams
Attorney, Agent, or Firm—Sewall P. Bronstein; David G. Conlin

[57] ABSTRACT

Water soluble fluors useful in enhancing images obtained in autoradiography have the general formula:

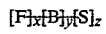

$$[F]_x[B]_y[S]_z$$

F is a moiety which acts as a fluor, e.g., a dehydro derivative of a compound which is a fluor; preferred examples include 4-(2,5-diphenyloxazolyl), 1-naphthylmethyl, 2-naphthyl, and 4-[5-(2-phenyloxazolyl)]phenyl. S is a surfactant moiety which makes the molecule hydrophilic, e.g., dehydro derivatives of surfactants; preferred examples include polyethylene glycol derivatives, sulfonic acids or salts thereof, aryl sulfonates, amines and quaternary ammonium compounds. B is a binding moiety which chemically binds the fluor moiety F with the surfactant S, and may be a chemical bond, or a disubstituted moiety such as an alkylene, e.g., methylene group. The variables x, y and z are integers which can generally vary from 1 to 10. A number of such compounds are disclosed, as well as methods of using such compounds, as well as compositions and products for fluorographic analysis in connection with chromatography, electrophoresis etc.

5 Claims, No Drawings

WATER SOLUBLE FLUOR COMPOSITIONS

BACKGROUND OF THE INVENTION

This invention relates to water soluble fluors. More specifically, it relates to a new class of water soluble fluors, their preparation and their use as enhancers for radioactivity detection in auto-radiography.

Auto-radiography is the production of an image in a photographic emulsion by a radioactively labelled substance. Auto-radiography is an important method in biological, biochemical, and clinical investigations and analyses. One of its principal uses is to locate bands of radio labelled materials, e.g., molecules radio labelled with $^3H$, $^{14}C$, $^{32}P$, $^{35}S$, or $^{125}I$ on chromatography plates or on slab gels used for electrophoresis. The usefulness of auto-radiography, however, has frequently been limited because of the long exposure times usually required for the low radiation levels of isotopes incorporated into the plates and gels and, in some cases, the very weak energies of radiation.

One approach taken to overcome that problem has been the use of scintillation materials which act as amplifiers of the exposure process. Radiation energy causes the fluor present in the system to emit light on a certain wavelength, and the light exposes the photographic emulsion in a way that is much faster and more efficient than could be obtained by relying on auto-radiography alone. The combination of autoradiography and fluorescence is called fluorography or autofluorography. Bands of material labelled with radioactive isotopes can be detected more readily and rapidly in, for example, slabs of electrophoresis gel, by means of fluorography.

In chromatography and electrophoresis, the radioactive material to be measured is absorbed or adsorbed according to conventional techniques on or in an organic or inorganic absorbent or adsorbent layer or column of separation medium or material, e.g. silica gel, alumina, cellulose, polyamide, polyacrylamide, crosslinked dextran, agarose, etc., which is usually supported on a plate, e.g. glass or plastic sheet. This is called a chromatogram or electrophoretogram.

Two of the most common separation media used in electrophoresis are aqueous polyacrylamide and agarose gels.

Gel electrophoresis is a method of separating charged particles, such as proteins, whereby the charged particles move through a gel medium under the influence of an applied electric field, their rate of movement through the lattice formed by the hydrated gel being dependent on charge and molecular size or weight. When the electric field is removed, the particles are present in the gel in discrete bands which can either be sliced up for liquid scintillation counting, or in the case of radionuclides such as tritium which emit lower energy particles, more preferably analyzed by fluorography.

In the case of radioactive labelled animal tissues, e.g. tissue autoradiography, the radioactive material is usually administered to the live animal and becomes selectively absorbed or adsorbed into certain tissues so that the tissue, usually in the form of a thin slice, may be considered as the absorbent or adsorbent layer. In the case of paper chromatography the paper (cellulose) is the adsorbent.

Where the adsorbent material is in the form of a thin layer supported on a plate, it is called thin layer chromatography and a thin layer chromatogram.

In autoradiography, the radioactivity of the material being tested is measured by a film sensitive to radioactivity.

In autofluorography, a fluor or scintillator, which is excited or stimulated by radioactivity to emit light, is applied in close proximity to the radioactive material and the intensity of light emission is measured by a photographic film, which is sensitive to light. Conventionally, the photograph is taken with the radioactive sample sandwiched against the emulsion of the film.

Fluorography has important advantages over conventional autoradiography, the most important of which is a markedly shorter exposure time (typically shortened from two weeks to 16 to 24 hours) with weak radioactive emitters, such as tritium.

However, in spite of this important advantage, presently known autofluorographic techniques have serious disadvantages, particularly in systems where relatively thick layers of absorbent or adsorbent materials are used in the separation process, e.g., polyacrylamide gel electrophoresis which is frequently used in receptor site, nucleic acid, and enzyme research.

One of the problems is in developing a method for placing and maintaining the scintillator fluor in close proximity to the radioactive emitter. If not in close proximity, a portion of the emitted radioactive particles will not reach the scintillation fluor. In the case of thin layer chromatography, the scintillator fluor has been dissolved in a suitable carrier, e.g. benzene or toluene, and then sprayed onto the thin layer separation medium, e.g. a paper strip, containing the radioactive sample. After drying, a piece of film sensitive to the light emission of the scintillator may then be juxtaposed and this sandwich is allowed to stand for a time sufficient to achieve exposure. In such a system, it is difficult to evenly distribute the scintillator fluor, the radioactive material may spread and diffuse, and the small crystals of scintillator fluor tend to be so loosely bound that great care must be exercised in handling the sample.

In addition to the above disadvantages it is sometimes desirable to use thicker layers of adsorbent or absorbent material. Once any appreciable thickness is used, i.e. greater than about 0.1 mm, the technique of spraying no longer places the scintillator fluor in close enough proximity to enough of the radioactive material. This results in a drastic loss in the ability of the scintillator fluor to be excited by the emitted particles and convert them into light.

Accordingly, it is necessary to somehow transport the scintillator fluor into the interior of the separation medium. One method for accomplishing this transportation is by soaking the separation medium of absorbent or adsorbent material in a bath containing the scintillation fluor dissolved in a suitable carrier.

A number of fluorography systems are currently available. One system was described by Bonner et al, *Eur. J. Biochem.* 46:No. 1: 83–88 (1974), the disclosure of which is hereby incorporated herein by reference.

In that method the radioactively-labelled protein is separated by electrophoresis using an aqueous polyacrylamide gel, followed by soaking the gel in about 20 times its volume of dimethylsufoxide (DMSO) for 30 minutes, and then immersed a second time for 30 minutes in fresh DMSO to displace all the water from the gel. The next step is to soak the gel in a 20% (w/w)

solution of 2,5-diphenyloxazole (PPO) in DMSO to impregnate the gel with scintillator which is then precipitated in the gel by washing with water. The gel is finally dried and exposed to the film. This technique has numerous disadvantages, many of which are reported in the appendix of an article by Laskey and Mills in the *Eur. J. Biochem.*, Vol. 56, pages 335–341 (1975), incorporated herein by reference. Agarose gels containing less than 2% polyacrylamide (plus 0.5% agarose) or agarose alone dissolve in DMSO unless methanol is substituted for the DMSO. Even this substitution is only effective for gels having less than 2% polyacrylamide, since gels having higher concentrations of polyacrylamide shrink severely when contacted with methanol. Even at 30% methanol, shrinkage of higher polyacrylamide concentration gels may take place. Another disadvantage is that the failure to remove all the DMSO may result in adhesion of the film to the gel and artifactual blackening of the film. Another disadvantage is the ability of DMSO to penetrate through the skin of anyone handling it by itself or the gel which has been soaked in it, thereby carrying toxic dissolved material with it through the skin as well as imparting a garlic smell to the person's breath. Another disadvantage is that the gels must be soaked in the DMSO-fluor solution for as much as 3 hours to obtain complete impregnation. A further disadvantage is that high concentrations of PPO, concentrations between 14% and 19% (w/w) being typical, must be used in the impregnation solution. Another disadvantage with DMSO as well as with other conventional carriers is that while PPO is efficient in converting absorbed radiation into photons of light, it is somewhat limited in its ability to absorb the energy emitted by the radioactive emitter. Another disadvantage is that the soakings in DMSO to dehydrate the gel are time-consuming.

One method for increasing the absorption ability of PPO when thin layer chromatography is being employed is described in Bonner and Stedman, *Analytical Biochemistry*, Vol. 89, pages 247–256, 1978, incorporated herein by reference. Three methods for detection of $^3H$ and $^{14}C$ in silica gel thin layer chromatograms are described in that article. The first method utilizes 2-methylnaphthalene (2MN) which is described as being a scintillation solvent for use in solid systems by analogy to scintillation fluids which many times contain a solvent in addition to the scintillator. As in liquid systems, the solvent molecules collect the energy from the emitted beta radiation and transfer it to PPO molecules, which then emit photons of light. A solvent is a compound which converts the kinetic energy radiated by the radioactive emitter to electronic excitation energy and transfers that energy to the fluor dissolved therein. The first method comprises dipping the dried thin layer plates in a solution of 2MN which has been liquified by heating and which contains 0.4% (w/v) of PPO, until they are soaked and then removing the plates from the solution. When the solution has solidified, the plate is placed against film and exposed. An alternative, if spraying is deemed to be more desirable, is to replace 10% of the 2MN with toluene to make the solution a liquid at room temperature. The second method involves dipping the plates in an ether solution containing between 7% and 30% (w/v) of PPO, drying the plates and then exposing as above, with better sensitivity being seen as the PPO concentration increases. The third method involves dipping the thin layer plates in melted PPO until soaked, removing and then heating until the excess PPO has drained off, and exposing to film as above. While useful in thin layer chromatography, numerous problems exist in attempting to use such systems with other media. One problem is that neither PPO nor 2MN is soluble nor miscible in water to any appreciable extent. Accordingly aqueous polyacrylamide or agarose gels are not impregnated with PPO nor 2MN while in the hydrated state, nor even if dried since the lattice structure collapses upon drying. Secondly, PPO and 2MN are very expensive even if it were possible to use them in such systems. The second method also is not useful with aqueous gels since ether and similar solvents such as alcohols cause drastic shrinkage of such gels. Furthermore, relatively high (7% to 30%) concentrations of expensive PPO in the ether are required for efficient fluorography.

Another fluorographic system has been described in U.S. Pat. No. 4,293,436, issued Oct. 6, 1981 to Dennis L. Fost, the disclosure of which is also incorporated herein by reference. In that method, the aqueous separation medium or other medium to be subjected to fluorography is impregnated with a water-soluble or water-miscible lower alkyl carboxylic acid in which a scintillator fluor has been dissolved or dispersed, followed by precipitation of the fluor within the gel or tissue by aqueous soaking. However, that procedure also suffers from disadvantages. Handling of the fluors, which are generally soluble only in organic solvents, requires impregnation times in subsequent manipulation steps that are long as compared with the times of the present invention, e.g., two to three times the periods required with this invention. The fluorescent system may also fade with time, and its enhancement drop within a relatively short period of time. Further, the treatment with highly concentrated carboxylic acid, and the further treatment of extended aqueous soaking, both tend to adversely affect the sharpness of the bands, thus decreasing the accuracy of the procedure. The carboxylic acids may also cause the gel being treated to swell, and this requires the addition of an anti-swelling agent.

Another system, not necessarily prior art to the present invention, is now being marketed by National Diagnostics under the mark AUTOFLUOR. The exact nature of that material is not known, but a sample obtained some months ago appeared to contain a naphthol disulfonic acid. The material was unstable, and thus could not be utilized effectively after relatively short periods of time. A more recent sample seems to be based on sodium salicylate. For the disadvantages of using sodium salicylate, see J. P. Chamberlain, *Anal. Biochem.* 98:132–5 (1979).

It is an object of this invention to provide a new auto-fluorographic enhancer, containing water soluble fluors which eliminate the problems associated with the impregnation of gels, and permit wider and more convenient use of fluorography.

Ott et al, *J. Am. Chem. Soc.*, 78:1941 (1956), the disclosure of which is hereby incorporated herein by reference, reported the preparation of 2,5-diphenyl-3-methyloxazolium salts, which were apprently soluble to some degree in water and had some fluor properties. However, these compounds are only stable in acidic solutions, and are rapidly and quantitatively converted to the N-methyl-alpha-acylamido ketone by hydrolytic ring cleavage in alkali. Accordingly, their use as autoradiographic enhancers is severely limited.

Bodendorf et al, *Archiv. der Pharm.*, 298:293 (1965), the disclosure of which is also incorporated herein by reference, reported the preparation of 4-[(2,5-diphenyloxazolyl) methyl] piperidinium hydrochloride and 4-[(2,5-diphenyloxozolyl) methyl] morpholine. However, those materials were neither synthesized, formulated nor tested for use in fluorography.

Certain water soluble compounds, such as alphanaphthol polyethylene glycol (Naftaxol-Hoechst), p-octylphenolpolyethylene glycol (Triton-X-100, Rohm & Has) and p-nonylphenylpolyethylene glycol (Igepal CO730, GAF) are known as surfactants. Although those compounds do in fact possess some fluorescent properties, they have not been utilized as enhancers for use in auto-radiography. Typically such materials have low quantum efficiencies, e.g., below 0.2 to well below 0.1, and many such materials may fluoresce at wavelengths which are not suitable for fluorography.

STATEMENT OF THE INVENTION

The present invention contemplates a new system of fluorography, using certain water soluble fluorescent materials, both neutral and charged. Most of the fluorescent materials described herein have been prepared for the first time. They are stable at elevated temperatures, and their water solubility, thermal stability, and immobility in gel assures their effectiveness. The materials described are highly effective in enhancing the image obtained in fluorography, when used either singly or as matched pairs or sets of enhancers. Further, the systems used in incorporating these enhancers are stable for long periods of time, both in the bottle and in the gel, which can be important for long exposure testing or in the common situation in which it is desired to store the gel and retest it at a later date (e.g., use as a standard).

The enhancer compositions of the present invention generally contain a fluorescent material having the following formula:

$$[F]_x[B]_y[S]_z \quad (1)$$

wherein F is a moiety which acts as a fluor, S is a hydrophilic surfactant moiety which renders the molecule water soluble, and B is a structure which binds the surfactant to the fluor. The value subscripts x, y and z may be between 1 and 10 and are preferably between 1 and 3. Where x, y or z is more than one, each F, B or S may be the same or may be different.

The fluor portion of the molecule may be derived from any of the known fluors which efficiently collect the radiation from the radioactive labelled compound and emit light at a wavelength corresponding to the sensitivity of the photo emulsion, and which is chemically inert to the other components of the fluorographic composition and the gel. Preferred fluors are those which are stable and have a high quantum efficiency, i.e., those that are efficient in converting received radiation into light. Preferably the fluors in accordance with the present invention have a quantum efficiency of at least above about 0.1, more preferably above about 0.2, and most preferably at least one fluor in the fluorographic enhancer composition of the present invention has a quantum efficiency above about 0.6. Preferably the F portion of the molecule of equation (1) is a radical derived from substituted or unsubstituted 2,5-diphenyloxazole (PPO), e.g., 2,5-diphenyl-4-methyloxazole, naphthalene and its derivatives, e.g., 1-methyl naphthalene, unsubstituted or substituted terphenyl, e.g., m-terphenyl, p-terphenyl, 3, 3'-dimethyl-p-terphenyl, substituted or unsubstituted fluorene, e.g., 1,2 benzofluorene or 1-methyl fluorene, isopropyl phenyl biphenylyloxadiazole (isopropyl PBD), 2-[1-naphthyl]-5-phenyloxazole (B-NPO), t-butyl phenyl biphenylyl oxadiazole (butyl PBD), p-quarterphenyl, or derivatives of other fluors known per se in the art. See, e.g., Berlman, *Handbook of Fluorescence Spectra of Aromatic Molecules* (Academic Press, N.Y. 1971), the disclosure of which is hereby incorporated herein by reference. Presently preferred are derivatives of PPO, naphthalene, p-terphenyl and fluorene. Highly advantageous results can be obtained with fluorescent materials (compounds or compositions) containing derivatives of a plurality of fluors, such as combinations of derivatives of PPO and naphthalene, of terphenyl and naphthalene, of PPO and fluorene, etc.

The surfactant S part of the molecule of formula (1) may be any surfactant which can be bound to the fluors described above to make the resulting molecule water soluble or water miscible, stable and non-reactive with the other components of the system. The surfactant used may be anionic, cationic, non-ionic, or amphoteric. They may be known surfactants, such as polyethylene glycol derivatives, aryl sulfonates, amines, quaternary ammonium salts, or, they may be pre-surfactants, which, as used herein, shall mean moieties which, when chemically combined with the fluor in accordance with formula (1), make the resulting compound water soluble or water miscible. A preferred example of the latter is the sulfonic acid radical, or salt thereof, which when combined with aryl fluors, can result in arylsulfonates which have hydrophilic surfactant properties. Presently preferred examples of S in formula (1) are sulfonic acid or salt residues ($-SO_3H$ or $-SO_3$); polyethylene glycol, preferably having a molecular weight of about 100 to 10,000, more preferably 200 to 1500, most preferably about 300 to 1200; substituted or unsubstituted aryl or alkaryl sulfonates, such as benzene sulfonate, toluene sulfonate; amines and derivatives thereof, such as methylamine; amides, e.g., acrylamide; imides such as phthalimide and residues which, together with $[F]_x$ or $[F]_x$ and $[B]_y$ in formula (1) create quarternary ammonium salts, e.g., trimethyl ammonium chloride, N-benzyl,—N,N-dimethyl ammonium chloride. Other suitable reactable surfactants or pre-surfactants are known or readily apparent to those of ordinary skill in the art. See, e.g., McCutcheon's Publications/1980 (MC Publishing Co., Glen Park, N.J. (1980), the disclosure of which is hereby incorporated by reference.

The binder B in formula (1) may be any moiety which chemically bonds the fluor with the surface active agent, without destroying the properties of either, and which, when in combination with the fluor and the surfactant, is not reactive with the other necessary components of the system. B may simply be a chemical bond, or may be an alkylene linkage, preferably a substituted or unsubstituted lower alkylene linkage of 1–6 carbon atoms, e.g., methylene, ethylene, propylene, etc.; alkenyl moieties, such as ethenylene, propenylene, etc.; carboxy moieties such as carbonyldioxy, malonyl, methylenedioxy, epoxy, etc.; arylene, e.g., phenylene, diphenylene, etc.; alkarylene, e.g., methylphenylene or styrene; or it may be thio or another sulfur group.

The compositions of the present invention can be obtained from commercially available products, by reactions which the skilled in the art will readily appreciate in the light of the present disclosure. For example, fluor compounds having, or modified to have, alkyl halide substituents may be reacted with nucleophilic substituted surfactants or pre-surfactants having a wide variety of reactive groups, including hydroxy, alkoxy, carboxy, amino, thio and other groups. Thus fluors having alkyl halide groups can be reacted with surfactants or pre-surfactants having available hydroxyl groups, to form ether linkages (e.g., polyethylene glycol surfactants of various chain lengths) ethoxylated alcohols, fatty alcohols and derivatives thereof etc; with surfactants or pre-surfactants having available carboxyl groups to form ester linkages, (e.g., fatty acids and derivatives), with surfactants having available substituted or unsubstituted amino groups to form substituted amino linkages, (e.g., ammonia or primary, secondary or tertiary amines) etc. Where the fluor contains an aryl group or other group subject to sulfonation, the fluor can be sulfonated to yield water soluble aryl sulfonates in known manner (e.g., sulfonation of terphenyl in fuming sulfuric acid to yield terphenyl sulfonates). Other reactions between fluors and surface active agents having different reactive groups will be readily apparent to those skilled in the art from this disclosure.

The scintillator compositions of the present invention can advantageously contain a number of other materials. In addition to a solubilized primary fluor, the scintillator composition can contain a secondary fluor, or spectrum shifter, which absorbs light at the wavelengths emitted by the primary fluor and emits electromagnetic energy at a wavelength to which the photographic film is sensitive. The secondary fluor can be water solubilized by reacting with a surface active agent and as linking structures in the same way the primary fluor is solubilized as described herein. A wide variety of secondary fluors are available, including p-bis-[2-(4-methyl-5-phenyloxazolyl)] benzene (called dimethyl POPOP), or p-bis-(o-methylstyryl) benzene (called bis-MSB), p-p'diphenyl stilbene, 9,10-diphenyl anthracene, POPOP, and 2,5-diphenyloxazole (PPO). Suitable matched combinations of materials include solubilized PPO and solubilized POPOP, or solubilized PPO and solubilized bis-MSB, etc. Preferred combinations of fluors for use in fluorography, which achieve good fluorescence in the range of sensitivity of commercial x-ray film, include solubilized PPO or suitable derivatives thereof as secondary fluors and solubilized naphthalene, anthracene, terphenyl, etc. Preferably, the enhancing compositions contain at least one fluor or derivatives thereof having a quantum efficiency of about 0.2, more preferably above about 0.5 or 0.6 in the composition. Preferably the quantum efficiencies of all fluors in the system are high, e.g., above about 0.25, more preferably above about 0.3, although systems which contain a mixture of fluors of varying quantum efficiencies, e.g., a mixture of solubilized naphthalene having a relatively low quantum efficiency (e.g., naphthalene sulfonate) and solubilized PPO (e.g., PPO sulfonates) have been found to be very effective in enhancing fluorographic exposures.

The scintillation compositions of the present invention can also advantageously include an antioxidant to prevent decomposition of the fluor or other components during storage. A wide variety of antioxidant materials are known to the art and any of these is acceptable, provided that they are inert to the other ingredients, to the gel or chromatographic material, and to the composition being analyzed. Examples of antioxidants for use with the present invention would include ascorbic acid, citric acid and butylated hydroxytoluene (BHT). Still other materials may also be included. See e.g., U.S. Pat. No. 3,068,178, the disclosure of which is incorporated herein by reference.

Although the materials and methods of the Fost U.S. Pat. No. 4,293,436, were a major advance over the previously used method of Bonner et al, the Fost materials still suffered from substantial disadvantages. The Fost compositions required a first step of soaking the gels for one hour or more in the Fost composition to impregnate the scintillation composition into the gel structure, and followed by immersion in water under agitation for one hour or more in order to precipitate the Fost water-insoluble materials within the gel, followed by drying and exposure to the photographic film. The immersion in water tended to blur or displace the lines of materials in the gel, and added substantial time to the Fost procedure. The Fost composition also contained noxious compounds which were unpleasant to deal with.

Largely because of their water soluble nature, the scintillation compositions and fluors of the present invention are much simpler, safer, and more pleasant to use, and save very substantial amounts of time as compared to the compositions and methods of either Fost or Bonner et al. The fluors of the present invention are generally water soluble and inert. Those of the present fluors which are either nonionic or can be copolymerized with the separation material can be simply incorporated in the electrophoresis gel, chromatographic media etc. *before* the electrophoresis or chromatography is run. This procedure requires no special impregnation or other procedure after electrophoresis. For example, an electrophoresis gel slab which already contains the fluor need only be dried in the normal manner and exposed to the photographic film. The resulting exposures are clearly enhanced by the presence of these fluors.

However, it is not necessary to incorporate the fluors in the gel or other material itself before electrophoresis in order to obtain the benefits of the present invention. Standard gels need only be soaked in the scintillation compositions of the present invention for a much shorter period of time than the Fost compositions, to allow the fluors to be impregnated in the gel. Preferably the gel is soaked from 5 to 45 minutes, more preferably from about 10 to 20 minutes and the resulting gel after electrophoresis, for example, need only be dried and exposed to photographic film. Because the scintillation compositions are water soluble, they are readily impregnated into the gel, and no dehydration step is required as in the method of Bonner et al and no precipitation step as required by Fost is necessary. Therefore the time between the completion of electrophoresis or chromatography and the start of film exposure is substantially reduced.

When utilized as part of the electrophoresis gel or chromatographic material, the fluors of the present invention, either alone or in combination with each other or with other materials, may be present in a widely varying ranges of concentration. Generally the fluors should be nonionic in nature, so as not to migrate under the electric field. The fluors should be present in at least sufficient quantities to provide enhancement of the photographic exposure, but not so concentrated as to adversely affect the ability of the gel or other material to polymerize, the motility of the sample components through the electrophoresis gel, or the sorbtion characteristics of the chromatographic material.

Broadly the fluor(s) may be present in from about 1% to about 100% by weight based on the weight of the acrylamide or other monomer, i.e., based on the weight of the solids content of the separation medium; preferably from about 5% to about 85% by weight; most preferably from about 20 to about 30% by weight.

More than one water soluble fluor can be polymerized or otherwise incorporated into the electrophoresis or other gel material. For example, copolymers of acrylamide monomers with two or more water-soluble fluors of the present invention are particularly advantageous embodiments of the present invention. The amounts of water soluble fluors in the copolymer may vary from that amount which just gives enhancement to essentially purely comonomers of those fluors, but preferably the fluors are about 5-85% of the monomer. Preferably the weight ratio of water soluble fluors to monomer is within about 23%, to about 76%, most preferably 20 to 30% by weight of the copolymer. The molecular ratio of one water soluble fluor to another in the copolymer may broadly range from 100:1 to 1:100, but preferably ranges from about 15:1 to 1:15. That ratio will depend to some extent on whether one of the water soluble fluor monomers in the copolymer is serving as a secondary fluor for the other water soluble fluor(s) in the copolymer, as will be appreciated by those skilled in the art from this disclosure.

Where the fluor is to be incorporated into the gel or other material by soaking the material in a solution of the fluor(s) in an impregnation step, the ranges of concentrations useable are similarly broad. Generally the fluor(s) may be present in amounts ranging from about 0.001 molar to about 2.0 molar; preferably about 0.005 M to about 1.0 M, more preferably from about 0.15 M to about 0.45 M. Generally, the higher the concentration of fluor(s) in the impregnation bath, the faster the fluor(s) will diffuse into the gel or chromatographic material, but increasing viscosity, increased difficulty of handling, and adversely affected mass transfer coefficients may be encountered at higher concentrations.

The present invention will be further understood with reference to the following illustrative embodiments, which are exemplary only, and not to be taken as limiting the invention.

EXAMPLE 1

Preparation of 4-chloromethyl-2,5-diphenyloxazole 100 grams (613 millimoles (mM)) of Isonitrosopropiophenone (available from Eastman Organic Chemicals) and about 65 grams (613 mM) of benzaldehyde are dissolved in glacial acetic acid and HCl gas was bubbled through the solution with stirring until a yellow precipitate was found. The precipitate was collected and washed with ether until it was white. This product was dissolved in methanol with some heating, and neutralized with sodium hydroxide. The product had the formula

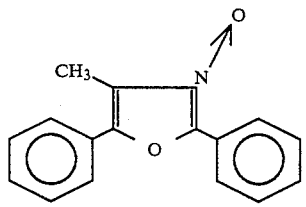

This product was dissolved in ethanol, placed in a sealed reaction container with freshly activated Raney-nickel catalyst and degassed by vacuum. The systems were then charged to a pressure of about 3 atmospheres with hydrogen gas. The reaction was continued, with supplemental hydrogen being added, until hydrogen was no longer consumed; and thin layer chromatography using 8:1 hexane/ethyl acetate on silica gel showed no starting material. This took a period of approximately 2 hours. Then the catalyst was filtered, the solution distilled off, and the resulting white crystals of 4-methyl-2,5-diphenyloxazole were dried in a vacuum oven.

Five grams of this product (about 21 mmol) was dissolved in carbon tetrachloride. A catalytic amount (about 25 mg) of benzoyl peroxide was added, and the solution was heated to reflux. About 1.7 ml (about 21 mmol) of sulfuryl chloride was added dropwise to the refluxing mixture and refluxing was continued for about an hour. Thereafter the mixture was allowed to cool to room temperature, where it stayed overnight. The solvent was removed under reduced pressure, and the remaining product, 4-chloromethyl-2,5-diphenyloxazole, was recrystallized from ethanol. Yield was 3.8 g (67%), melting point 138°-9° C.

EXAMPLE 2

Preparation of Methoxypolyethyleneglycol 4-(2,5-diphenyloxazolyl) methyl ether

About 7.5 grams (10 mM) of a polyethylene glycol monomethyl ether having an average molecular weight of about 750 was dissolved in 75 cc of dry toluene. The polyethylene glycol monomethyl ethers are readily available in the molecular weight ranges discussed herein (e.g. from the Aldrich Chemical Company), and/or are easily prepared by those skilled in the art. A small portion of toluene was distilled to ensure that the reagent and the solvent were completely dry. The toluene solution was cooled to room temperature, and 0.3 g (12.5 mM) of sodium hydride was slowly added. The mixture was then stirred under argon at room temperature until no further hydrogen was evolved. About 2.5 g (9.5 mM) of 4-chloromethyl-2,5-diphenyloxazole, dissolved in about 20 cc of toluene, was added to the resulting mixture. The mixture was then refluxed until all of the 4-chloromethyl-2,5-diphenyloxazole had reacted. The reaction was monitored by thin layer chromatography utilizing a solvent consisting of 1 volume ethyl acetate to 8 volumes of hexane, on a silica gel plate. The salt was separated by filtration, and the product was treated with decolorizing charcoal, and subjected to solvent removal in a vacuum. The resulting product was obtained in the form of an oily residue, which solidified on standing at room temperature.

EXAMPLE 3

Preparation of Polyethylene glycol di-1-naphthylmethyl ether

Polyethylene glycol having an average molecular weight of about 400 was dissolved in about 75 cc of toluene. A small portion of toluene was distilled to ensure that both the reagent and the solvent were completely dry. To the cooled solution, about 1.1 g (45 millimoles) of sodium hydride was added. The mixture was stirred under argon at room temperature until no further hydrogen was evolved. 7 g (40 mmoles) of 1-(chloromethyl)naphthalene was added, and the mixture was refluxed until all of the 1-(chloromethyl) naphthalene had reacted. The 1-(chloromethyl) naphthalene is commercially available, e.g., from Eastman Organic Chemicals Division of Eastman Kodak. The reaction was monitored by thin layer chromatography using the ethyl acetate/hexane systems of Example 2. The reaction mixture was treated with decolorizing charcoal, yielding the product after vacuum filtration. The product was oily and not soluble in water.

EXAMPLE 4

Preparation of Polyethyleneglycol di-1-Naphthyl Methyl Ether

By the same method, polyethyleneglycol di-1-naphthylmethyl ether was prepared from a polyethyleneglycol having an average molecular weight of about 600. The product was oily and partially soluble in water.

EXAMPLE 5

Preparation of Polyethyleneglycol di-1-Naphthyl Methyl Ether

Polyethyleneglycol having an average molecular weight of about 1,000, (10 g; about 10 mM) was dissolved in 75 cc of toluene. A small portion of toluene was distilled until no further azeotrope came off. To the cooled toluene solution was added 0.6 g (25-moles) sodium hydride. The mixture was stirred under argon at room temperature until no further hydrogen was evolved. To this mixture 3.4 g (19-millimoles) of 1-(chloromethyl) naphthalene was added. The mixture was refluxed until all 1-(chloromethyl) naphthalene had reacted. The reaction was monitored by the above-described thin layer chromatography. The reaction mixture was treated with decolorizing charcoal, and the product was obtained after removal of charcoal by vacuum filtration and solvent distilled under vacuum.

EXAMPLE 6

Preparation of 4-[5-(2-phenyloxazolyl)] Benzene Sulfonic Acid 66.7 g of PPO (0.3 moles) was slowly added to 100 ml of fuming sulfuric acid with stirring. When the exothermic reaction subsided, the reaction mixture was stirred for an additional ½ hour, then poured into approximately 200 g of cracked ice. A white precipitate was formed immediately. This was collected, washed several times with ice cold water and finally with methanol.

Yield 80 g (90%) M.P. >320° C.

The product was then recrystallized from a mixture of methanol and water having 5 parts by weight methanol to 7 parts water.

|  |  | C | H | N |
|---|---|---|---|---|
| Analysis for | Calculated | 56.42 | 4.1 | 4.39 |
| Monohydrate | Found | 57.16 | 4.09 | 4.31 |

Hereafter that product is called "PPO-SO$_3$H."

EXAMPLE 7

Preparation of Terphenyltrisulfonic Acid Trisodium Salt 46.5 (0.2 moles) of p-terphenyl was added slowly to 100 ml of fuming sulfuric acid, with stirring. When the exothermic reaction subsided, the reaction mixture was heated at approximtely 100° C. for one hour, then poured into approximately 200 g of cracked ice. Suspended solid was filtered off, and sodium chloride was added to the filtrate until saturation.

A white precipitate, the tri-sodium salt of terphenyltrisulfonic acid, was filtered, washed with ice water, and finally washed with methanol.

|  |  | C | H |
|---|---|---|---|
| Analysis | Calculated | 40.23 | 2.25 |
|  | Found | 40.67 | 2.21 |

EXAMPLE 8

Preparation of Fluorene-2.7-Disulfonic Acid Disodium Salt 33.3 g of fluorene (0.2 moles) was stirred with 75 ml of 98% H$_2$SO$_4$ at 80°–90° C. for 15–20 minutes, at which time the reaction mixture solidified. The greenish, pasty mass was cooled and added to 250 ml of cracked ice. The solution was made basic with 50% NaOH solution, and the resulting product, a white precipitate, was collected and recrystallized from water.

Yield 75%.

|  |  | C | H |
|---|---|---|---|
| Analysis | Calculated | 38.43 | 2.98 |
|  | Found | 37.82 | 2.51 |

The structure was also confirmed by NMR analysis, showing peaks at 3.50 ($^2$H) and 7.5–8.00 ($^6$H).

EXAMPLE 9

Preparation of 2,5-Diphenyl-3-methyloxazolium Toluenesulfonate 10 g of 2,5-Diphenyloxazole was heated at 125° C. for 5–10 minutes with 30 g of methyl toluenesulfonate, both commercially available compounds. The solution was cooled, and anhydrous ether was added to precipitate the product. The product was recrystallized by dissolving in absolute ethanol and then adding ethyl acetate. The product was obtained in 95% yield, and had a melting point of 167°–168° C.

EXAMPLE 10

Preparation of 4-Phthalimido methyl-2,5-diphenyloxazole

A solution of potassium phthalimide (10 g, 54 mmoles) and 4-chloromethyl-2,5-diphenyloxazole (10.4 g, 40 mmoles) in 80 cc of dimethylformamide was heated at 100° C. for 2 hours. When the solution was cooled to room temperature 300 cc of water was added. The solution was extracted with chloroform several times. The combined chloroform solution was washed with 20–30 ml of 0.2N sodium hydroxide and finally with water. After drying over sodium sulfate the chloroform was concentrated. The product precipitated out.

Yield 11 g (73%)

M.P. 192°–3° C.

|  |  | C | H | N |
|---|---|---|---|---|
| Elemental | Calculated | 76.0 | 4.22 | 7.37 |
| analysis | Found | 76.10 | 4.20 | 7.50 |

EXAMPLE 11

Preparation of 4-Aminomethyl-2,5-diphenyloxazole

A mixture made up of 20 ml of 48% hydrobromic acid, 20 ml of glacial acetic acid and 10 g of 4-phthalimidomethyl-2,5-diphenyloxazole, was heated under reflux until a clear solution resulted (3 hrs.). The solvent was pulled off under vacuum until dryness. The residue was dissolved in 100 ml of water, made basic with 1N NaOH and extracted with ethyl acetate. The ethyl acetate solution was washed with water until neutral and dried over sodium sulfate. The solvent was pulled off under vacuum and the residue was recrystallized from ethyl acetate and hexane.

Yield 5.0 g (90%)
M.P. 103°–104° C.

| | | C | H | N |
|---|---|---|---|---|
| Analysis | Calculated | 76.80 | 4.80 | 5.60 |
| | Found | 75.64 | 4.97 | 5.43 |

EXAMPLE 12

Preparation of N-[4-(2,5-Diphenyloxazolyl) methyl] acrylamide 1.3 cc (15 g, 16 mmoles) of acryloyl chloride in 5 cc of ethyl acetate was added dropwise to a solution made up of 3 g of 4-aminomethyl-2,5-diphenyloxazole (12 mmoles), 15 cc pyridine and 50 cc of ethyl acetate. When the reaction was complete, the product was washed with water and dried over sodium sulfate. The solvent was pulled off under vacuum. The residue was recrystallized from ethyl acetate hexane mixture.

Yield 3.14 g (90%)
M.P. 169°–70° C.

EXAMPLE 13

Preparation of N-[4-(2,5-diphenyloxazolyl) methyl]-N-benzyl-N, N-dimethyl ammonium chloride A mixture made up of 4-chloromethyl-2,5-diphenyloxazole (6.2 g, 24 mmoles) benzyldimethylamine (10 g, 70 mmoles) and 60 ml of ethyl alcohol was heated under reflux for 2 hours. The product was isolated by addition of ethyl acetate.

Yield 9.3 g (100%)
M.P. 188°–190° C.

| | | C | H | N |
|---|---|---|---|---|
| Elemental | Calculated | 76.26 | 6.14 | 6.93 |
| analysis | Found | 76.64 | 6.35 | 6.75 |

EXAMPLE 14 Preparation of N-[4-(2,5-diphenyloxazolyl) methyl]-trimethyl ammonium chloride Trimethylamine was bubbled into a solution of 4-chloromethyl-2,5-diphenyloxazole (5 g, 18.5 mmoles) in 80 cc of ethanol. An exothermic reaction ensued. When the solution was saturated with trimethylamine it was stirred for 20 minutes. The product was precipitated by the addition of ethyl ether.

Yield 5.8 g (100%)
M.P. 248°–250° C.

| | | C | H | N |
|---|---|---|---|---|
| Elemental | Calculated | 69.51 | 6.40 | 8.54 |
| analysis | Found | 68.89 | 6.61 | 8.39 |

EXAMPLE 15

Preparation of a Water Soluble Terpolymer Containing N-[4-(2,5-diphenyloxazolyl) methyl] acrylamide, N-[1-naphthylmethyl] acrylamide and N-Hydroxymethyl acrylamide The terpolymer was prepared by the free radical polymerization of the components using benzoyl peroxide as catalyst at 70°–80° C. 30 mg of N-[4-(2,5-diphenyloxazolyl) methyl] acrylamide, 232 mg of N-[1-naphthylmethyl] acrylamide and 3.64 grams of a 60% aqueous solution N-hydroxymethyl acrylamide were heated in excess ethanol under nitrogen atmosphere with agitation at about 70° C. After stirring for about 10 minutes at 70° C. while nitrogen was bubbled through the reaction mixture, a white precipitate formed. The reaction was allowed to reflux for about 5 hours, and its progress was monitored by thin layer chromatography, using a 1 to 1 mixture of ethyl acetate and hexane on a silica gel plate. Thereafter the solvent was removed on a rotary evaporator. This terpolymer may then be copolymerized with an electrophoresis gel, e.g., a 5% polyacrylamide gel, and will result in enhancement of autoradiographs made using the resulting gel.

EXAMPLE 16

Gel Electrophoresis

In typical slab gel electrophoresis, acrylamide is polymerized into a thin rectangular slab between two glass plates. Sample wells are made at one end of the gel by placing a comb-shaped form into the reaction mixture before it polymerizes. After polymerization the form is removed, leaving sample wells molded into the polyacrylamide gel.

The electrophoresis apparatus is composed of two buffer reservoirs or wells. The anodic lead from the power source is immersed in the upper buffer well. The cathodic lead is contained in the lower buffer well. The circuit is completed by the polyacrylamide gel. The power source used is preset for constant voltage or constant current. In the following examples, the gel used was generally a 5% (%T) polyacrylamide gel containing about 2.7% N,N'-methylene-bisacrylamide, based on the weight of the monomer. The gel dimensions are approximately 11 cm×12 cm×0.15 cm. The buffer system is a Tris-borate-EDTA (TBE) system. The running buffer contains 90 mM Tris(hydroxymethyl)aminomethane with boric acid added until pH 8.3 and containing about 2.5 mM EDTA (ethylene diamine tetraacetic acid) disodium salt.

The samples run on the gels are New England Nuclear product NET-644, which contains a set of 11 DNA molecular weight markers, having a molecular weight range of $0.47$–$8.8 \times 10^5$ daltons, and being labelled with tritium ($^3$H) at the level of 100–1000 $\mu$Ci/mg DNA. The $^3$H-DNA is diluted with stock solution of sample buffer, which is made up of 1.0 ml of the above TBE buffer, 0.5 ml glycerol, 2.5 mg bromophenol blue, and 2.5 mg xylene cyanole FF. One volume of $^3$H-DNA solution is mixed with one volume of sample buffer. The optimal total sample size is between 10–30λ.

Each sample contains from 0.3 μCi to 0.005 μCi of $^3$H-DNA which will separate into 11 bands of from 60,000 dpm/band to 1,000 dpm/band. The glycerol serves to make the sample denser than the buffer for ease in application. The two dyes in the sample buffer serve as a visual clue to the progress of the gel. All of the gels were run at 100 V for approximately 2 hours. The gels were dried for 1 to 2 hours on a "Bio-Rad" brand dryer.

The autoradiography of the gels was conducted as follows:

An 8"×10" sheet of KODAK XAR-5 x-ray film was placed in a lead lined aluminum film cassette. The dried gels were placed on the film. The cassette was closed and clamped to insure good contact between the gels and the film. The cassette was wrapped in 2 layers of aluminum foil to guarantee the light seal and to prevent frost from forming on the cassette or film.

The cassette is placed in a −78° C. freezer for the specified exposure time.

When the exposure is complete, the film cassette is removed from the freezer and warmed to room temperature (approximately 2 hours).

The film is developed as follows:

| KODAK X-RAY Developer | 3 minutes | NO AGITATION |
| --- | --- | --- |
| STOP BATH (2% HAc) | 30 seconds | CONSTANT AGITATION |
| KODAK RAPID FIX | 5 minutes | INTERMITTENT AGITATION |

EXAMPLE 17

Fluors Directly Incorporated in Polyacrylamide Gel

A 5% gel with 10% methoxypolyethyleneglycol 4-(2,5-diphenyloxazolyl) methyl ether and 10% polyethyleneglycol di-1-naphthylmethyl ether was formed. 140 mg of the methoxypolyethyleneglycol 4-(2,5-diphenyloxazolyl) methyl ether of Example 2 and 140 mg of the polyethyleneglycol di-1-naphthylmethyl ether of Example 5 were dissolved in 28 cc of acrylamide solution. The gel which was formed was uniformly impregnated with the fluorescent compounds. The $^3$H-DNA NET-644 (0.3 μCi) was placed in each sample well. One control gel was run. It used no enhancement procedure. Two gels were placed on the same film. After 24 hours of exposure, the film was not darkened by the control gel. The gel impregnated with the experimental fluors was clearly enhanced. Eleven, dark, discrete bands were visualized.

EXAMPLE 18

Post Electrophoresis Impregnation

A 5% polyacrylamide gel was prepared and run as described above with 0.15 μCi of tritiated DNA ($^3$H-DNA) per sample. After electrophoresis was completed, the gel was soaked in a 5% (w/v) aqueous solution of the · methoxypolyethyleneglycol 4-(2,5-diphenyloxazolyl) methyl ether of Example 2.

This gel and a control gel were dried and exposed to film for 24 hrs. at −70° C. The gel that had been soaked in the experimental fluor solution showed evidence of enhancement. Bands appeared in the expected pattern. No such pattern was produced by the control gel.

EXAMPLE 19

Post Electrophoresis

A 5% acrylamide gel was prepared and run as described above with 50 nCi $^3$H-DNA per sample. After electrophoresis was completed, the gel was cut and the samples were soaked separately in 10 mM and 20 mM aqueous solutions of 4-[5-(2-phenyloxazolyl)] benzene sulfonic acid (PPO-SO$_3$H). The gels impregnated with the experimental fluor were clearly enhanced. No such enhancement was observed by the control gel.

EXAMPLE 20

A 5% acrylamide gel was prepared and run as described above with 50 nCi $^3$H-DNA per sample. After electrophoresis was competed, the gel was cut and soaked separately in 100 mM and 200 mM aqueous solutions of naphthalene-2-sulfonic acid sodium salt. The gels impregnated with the experimental fluor were clearly enhanced.

EXAMPLE 21

A 5% acrylamide gel was prepared and run in the normal manner with 50 nCi $^3$H-DNA per sample. After electrophoresis was completed, the gel was cut and soaked separately in the following aqueous solutions:

(A) 5 mM PPO-SO$_3$H and 200 mM Naphthalene-2-sulfonic acid sodium salt.

(B) 10 mM PPO-SO$_3$H and 100 mM Napththalene-2-sulfonic acid sodium salt, (C) 10 mM PPO-SO$_3$H and 200 mM Naphthalene-2-sulfonic acid sodium salt, (D) 10 mM PPO-SO$_3$H and 300 mM Naphthalene-2-sulfonic acid sodium salt, (E) 20 mM PPO-SO$_3$H and 200 mM Naphthalene-2-sulfonic acid sodium salt, (F) 20 mM PPO-SO$_3$H and 300 mM Naphthalene-2-sulfonic acid sodium salt.

(G) 20 mM PPO-SO$_3$H and 400 mM Naphthalene-2-sulfonic acid sodium salt.

The gels impregnated with experimental fluors were clearly enhanced.

EXAMPLE 22

A 5% acrylamide gel was prepared and run as described above with 50 nCi $^3$H-DNA per sample. After electrophoresis was completed, the gel was cut and the pieces soaked separately in 10 mM, 20 mM and 50 mM 16% EtOH solutions of 2,5-diphenyl-3-methyloxazolium toluene sulfonate.

The gels impregnated with the experimental fluor were clearly enhanced.

EXAMPLE 23

A 2% agarose gel was prepared by dissolving 1.0 gm of agarose in 50 ml of boiling buffer. The buffer consisted of 40 mM Tris HCl, 10 mM sodium acetate, 1 mM EDTA (pH 7.5). The hot agarose solution is poured between two glass plates with a comb-shaped form to create sample wells. The gels are allowed to cool for several hours. The $^3$H-DNA was diluted with a sample buffer consisting of 80 mM Tris-HCl, 20 mM Na acetate, 2 mM EDTA, 30% glycerol, and 2.5 mg bromophenol blue, in a 1:1 ratio. The running buffer was the same as the separating gel buffer. The gels were electrophoresed at a constant 14 mA. The electrophoresis was run as described above, with 100 nCi $^3$H-DNA per sample. After electrophoresis was completed, the gel was cut and soaked separately in a solution having the composition of solution C of Example 21.

The gels impregnated with experimental fluors were clearly enhanced.

While particular embodiments of the present invention have been shown and described, it will be apparent to those skilled in the art that changes and modifications may be made without departing from this invention in its broader aspects. Numerous other specific and unique advantages and applications of the present systems will be readily apparent to those of skill in this art and are intended to come within the scope and spirit of the following claims.

We claim:

1. A composition of matter, comprising at least two water soluble fluors, each fluor having a structure in accordance with the formula:

$$[F]_x[B]_y[S]_z$$

wherein F is a component which absorbs energy and emits electromagnetic energy, S is a component which makes the fluor water soluble, and B is a chemical bond or other component which bonds a component F with a component S, and x,y and z are from 1 to 10, said composition comprising an aqueous solution of 4-[5-(2-phenyloxazolyl)]benzene sulfonic acid or a water soluble salt thereof and naphthalene-2-sulfonic acid or a water soluble salt thereof.

2. A composition of matter, comprising at least two water soluble fluors, each fluor having a structure in accordance with the formula:

$$[F]_x[B]_y[S]_z$$

wherein F is a component which absorbs energy and emits electromagnetic energy, S is a component which makes the fluor water soluble, and B is a chemical bond or other component which bonds a component F with a component S, and x,y and z are from 1 to 10, said composition wherein each water soluble fluor is selected from the group consisting of: 4-[5-(2-phenyloxazolyl)]-benzene sulfonic acid or water soluble salt thereof, naphthalene-2-sulfonic acid or water soluble salt thereof, methoxypolyethyleneglycol 4-(2,5-diphenyloxolyl) methylether, polyethyleneglycol di-1-naphthylmethyl ether, 2,5-diphenyl-3-methyloxazolium toluene sulfonate, N-[4-(2,5-diphenyloxazolyl) methyl] acrylamide, N-[1-naphthylmethyl] acrylamide, N-[4(2,5-diphenyloxazolyl)methyl]-trimethyl ammonium chloride, N-[4-(2,5-diphenyloxazolyl) methyl]-N-benzyl-N,N-dimethyl ammonium chloride, 3. A composition of matter, comprising at least two water soluble fluors, each fluor having a structure in accordance with the formula:

$$[F]_x[B]_y[S]_z$$

wherein F is a component which absorbs energy and emits electromagnetic energy, S is a component which makes the fluor water soluble, and B is a chemical bond or other component which bonds a component F with a component S, and x,y and z are from 1 to 10, said composition wherein the water soluble fluor comprises a terpolymer of: N-[4-(2,5-diphenyloxazolyl) methyl]acrylamide, N-[1-naphthylmethyl]acrylamide and N-hydroxymethyl acrylamide.

4. A composition of matter comprising a water soluble fluor having a quantum efficiency about 0.6, and having a structure in accordance with the formula:

$$[F]_x[B]_y[S]_z$$

wherein F is a component which absorbs energy and emits electromagnetic energy, S is a component which makes the fluor water soluble, and B is a chemical bond or other component which bonds a component F with a component S, and x,y and z are from 1 to 10, wherein each water soluble fluor is selected from the group consisting of: 4-[5-(2-phenyloxazolyl)]benzene sulfonic acid or water soluble salt thereof, naphthalene-2-sulfonic acid or water soluble salt thereof, methoxypolyethyleneglycol 4-(2,5-diphenyloxolyl) methylether, polyethyleneglycol di-1-naphthylmethyl ether, 2,5-diphenyl-3-methyloxazolium toluene sulfonate, N-[4-(2,5-diphenyloxazolyl) methyl]acrylamide, N-[1-naphthylmethyl]acrylamide, N-[4-(2,5-diphenyloxazolyl) methyl]-trimethyl ammonium chloride, N-[4-2,5-diphenyloxazolyl) methyl)-N-benzyl-N,N-dimethyl ammonium chloride.

5. A composition of matter comprising a water soluble fluor having a quantum efficiency about 0.6, and having a structure in accordance with the formula:

$$[F]_x[B]_y[S]_z$$

wherein F is a component which absorbs energy and emits electromagnetic energy, S is a component which makes the fluor water soluble, and B is a chemical bond or other component which bonds a component F with a component S, and x,y and z are from 1 to 10, wherein each water soluble fluor comprises a terpolymer of: N-[4-(2,5-diphenyloxazolyl)methyl]acrylamide, N-[1-naphthylmethyl] acrylamide and N-hydroxymethylacrylamide.

* * * * *